Figure 3:
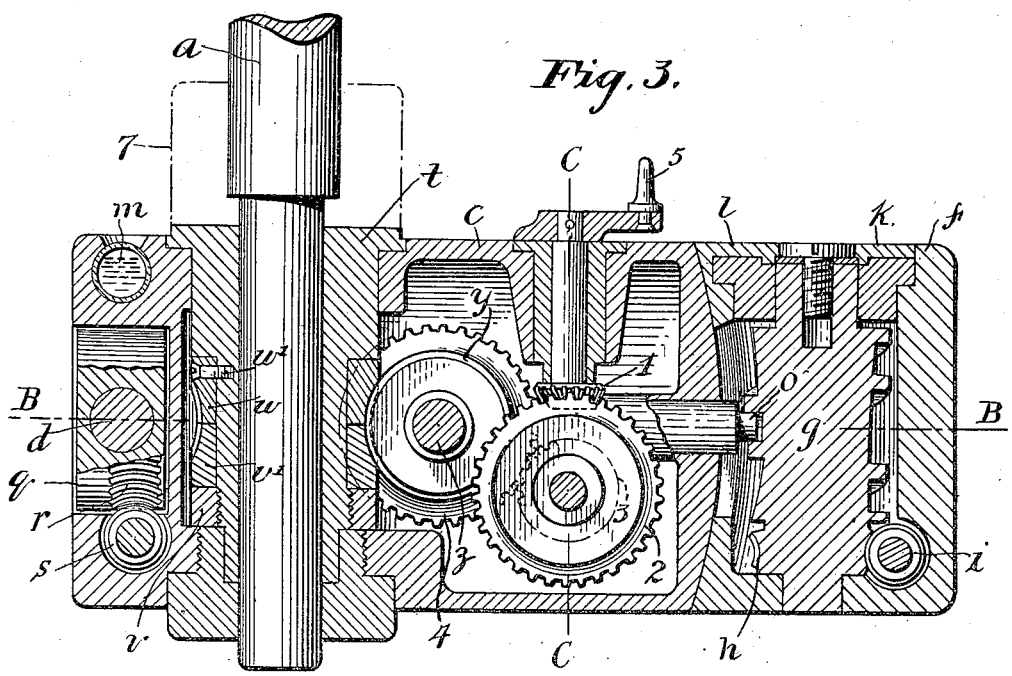

C. P. E. SCHNEIDER & E. RIMAILHO.
SIGHTING APPARATUS FOR GUNS.
APPLICATION FILED AUG. 22, 1906.
947,720.
Patented Jan. 25, 1910.
4 SHEETS—SHEET 1.
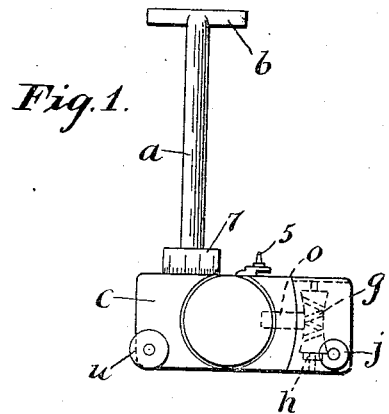
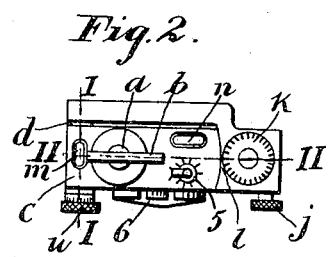
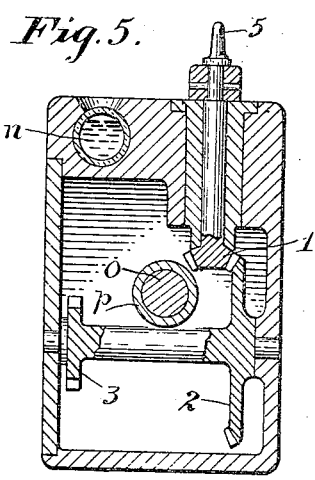
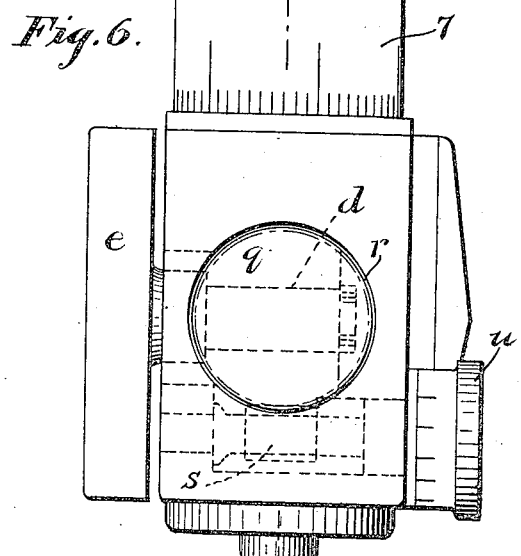
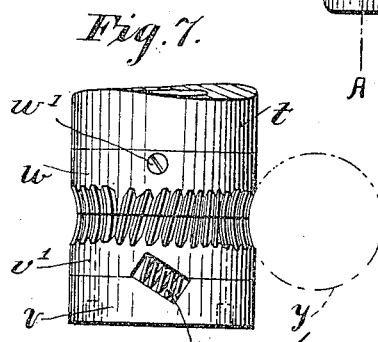
Witnesses:
R. C. Fitzhugh
M. A. Wood
Inventors:
Charles P. E. Schneider and
Emile Rimailho
by Mauro, Cameron, Lewis & Massie, attys.

C. P. E. SCHNEIDER & E. RIMAILHO.
SIGHTING APPARATUS FOR GUNS.
APPLICATION FILED AUG. 22, 1906.

947,720.

Patented Jan. 25, 1910.

4 SHEETS—SHEET 2.

Witnesses:
R. C. Fitzhugh.
M. A. Wood.

Inventors:
Charles P. E. Schneider and
Emile Rimailho.
by
Mauro, Cameron, Lewis & Massie
Attys.

C. P. E. SCHNEIDER & E. RIMAILHO.
SIGHTING APPARATUS FOR GUNS.
APPLICATION FILED AUG. 22, 1906.

947,720.

Patented Jan. 25, 1910.

4 SHEETS—SHEET 3.

C. P. E. SCHNEIDER & E. RIMAILHO.
SIGHTING APPARATUS FOR GUNS.
APPLICATION FILED AUG. 22, 1906.

947,720.

Patented Jan. 25, 1910.
4 SHEETS—SHEET 4.

UNITED STATES PATENT OFFICE.

CHARLES PROSPER EUGÈNE SCHNEIDER, OF LE CREUZOT, AND EMILE RIMAILHO, OF NEUILLY-SUR-SEINE, FRANCE.

SIGHTING APPARATUS FOR GUNS.

947,720.  Specification of Letters Patent.  Patented Jan. 25, 1910.

Application filed August 22, 1906. Serial No. 331,569.

*To all whom it may concern:*

Be it known that we, CHARLES PROSPER EUGÈNE SCHNEIDER and EMILE RIMAILHO, residing, respectively at Le Creuzot, Saône-et-Loire, France, and at 54 Boulevard Maillot, Neuilly-sur-Seine, Seine, France, have invented a new and useful Improvement in Sighting Apparatus for Guns, which is fully set forth in the following specification.

Sighting apparatus of the usual form of construction carry two levels, one, a longitudinal level, destined to give and measure the inclination of the gun in the plane of fire, for aiming in elevation; the other, a transverse level, designed to give the inclination of the sighting apparatus in relation to the axis of the trunnions for correcting the error which would result from an inclination of such axis. As we shall hereafter establish, it is very advantageous that these two levels may both participate in all the movements of the column or support of the sighting instrument, properly speaking, in order that the bubble of one of them may not be moved without producing at the same time a corresponding movement of the column. Now it is necessary for this that the geometrical axis of the column may be immovable with relation to the plane of the two levels, perpendicular the one to the other. Besides, it is necessary, as will be hereafter seen, that for the two levels, the angular displacements which have been given to them may be measured. For this it is necessary: 1st, that the column and the longitudinal level may be turned around the axis of the transverse level; 2d, that the column and the transverse level may be turned around the axis of the longitudinal level. It is necessary, finally, that these two rotations of the whole may be measured, that is to say, that they may be indicated on wheels with micrometric graduations.

The present invention relates to an apparatus which in a practical manner realizes all these conditions.

Figure 4:
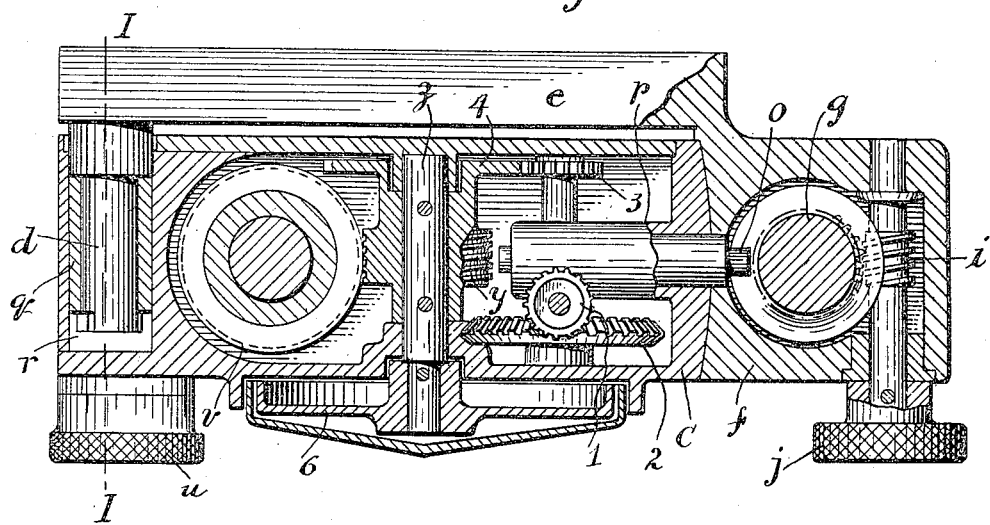
Figure 12:
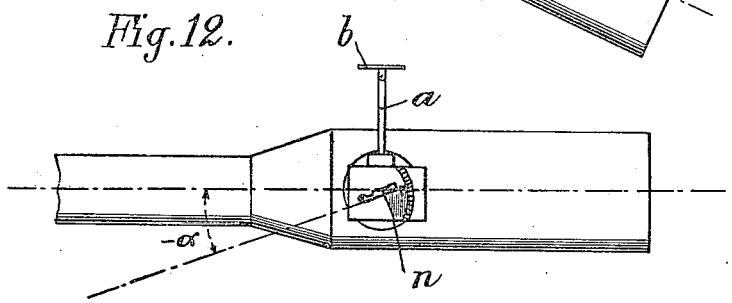
Figure 13:
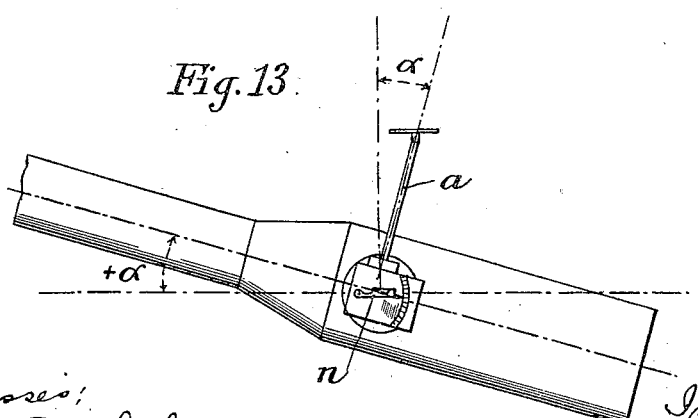

Figures 1 and 2 represent the apparatus in elevation and in plan, diagrammatically. Fig. 3 is a detail longitudinal section on the line A—A of Fig. 6. Fig. 4 is a sectional plan on the line B—B of Fig. 3. Fig. 5 is a cross-section on the line C—C of Fig. 3. Fig. 6 is an end elevation. Fig. 7 is a partial elevation of a detail. Figs. 8 to 11 are diagrammatic views illustrating the application of the new apparatus to the operation of sighting. Figs. 12 and 13 are corresponding views of known and analogous apparatus.

The supporting column $a$ of the sighting apparatus is carried in a socket in the block $c$, which caries the two levels $n$ and $m$ for the elevation and correction of the inclination of the axles. This block may be given a rotation in different directions around one of its points serving as center. This rotation results from two circular movements in two perpendicular planes passing through the said center and respectively parallel to the levels $m$ and $n$; the angular displacements registered thus giving the angle of elevation and the angle for correction of deviation.

The block $c$ which carries the column $a$ and upon the upper face of which the two levels $m$ and $n$ are arranged, is revoluble about diameter I—I, this diameter being parallel with the median plane of the level $m$. Along this diameter there is arranged a spindle $d$ carried by an arm $e$ forming part of a supporting block $f$. It is preferable in order to render the system compact that this block should be tangential externally to the spherical wall of the block $c$. As will be seen hereafter, the arm $e$ can form part of an extension $e'$ (Figs. 10 and 11) pivoted to the trunnions 8 of the cannon. In the block $f$ there is arranged a globe-screw $g$ which is able to rotate around its own axis, which latter is parallel with the axis of $a$. To this end the globe-screw carries in proximity to its lower extremity a tangential screw gear $h$ controlled by a screw $i$ which may be caused to rotate in the block $f$ by acting upon the handle $j$. At its upper extremity the screw $g$ carries a graduated disk $k$, which rotates with it, moving in front of an index $l$ of the block $f$.

In a guide $p$ there is arranged along a diameter II—II of the block $c$, perpendicular to the diameter I—I, a finger $o$ engaged in the thread of the screw $g$; it follows that the operation of the screw $g$ by the handle $j$ produces the displacement of the finger $o$ in the diametrical plane of the sphere passing through II—II and parallel with the level $n$, and the rotation of the block $c$ around the axis I—I. This movement of elevation is rendered obvious at each moment by the movement of the bubble of the level $n$ which is parallel with the axis II—II and the amplitude of the said movement is measured by the displacement of the disk $k$ relatively to the guide mark $l$.

The tilting movement of the block $c$ for correction of deviation is obtained in the following manner:—Upon the spindle $d$ there is passed a cylinder $q$ forming a tangential screw gear by its outer face. By means of its teeth $r$ it meshes with a screw $s$ capable of rotating in the block $c$ when it is actuated by the handle $u$. By rotating this handle the screw $s$ is caused to travel around the wheel $r$ and the block $c$ is caused to rotate around the finger $o$ the axis of which is in line with that of the cylinder $q$. The tilting movement is shown at each moment by the movement of the bubble of the level $m$ and its amplitude is recorded by a graduation carried by the handle $u$ and moving in front of the guide mark upon the side of the block $c$.

The support $a$ may be given a movement of rotation around its own axis. For this purpose it is passed into a socket $t$ having a reduced portion for receiving a sleeve $w$ which is made fast thereto by screw $w'$ and a loose sleeve $v'$ which is held in place thereon by a threaded sleeve $v$. The sleeves $v'$—$w$ are provided with external screw threads and together constitute a tangential screw wheel, the play of which is constantly taken up by a spring $x$ (Fig. 7) which has one end bearing in sleeve $v$ fast to socket $t$, and the opposite end bearing in loose sleeve $v'$. The screw wheel $v''$—$w$ meshes with the screw $y$ keyed upon a spindle $z$ carried by the block $c$ and actuated by a gearing-down transmission 1—2—3—4 actuated by the handle 5 or directly by a hand wheel 6 keyed upon the spindle $z$. The angular displacements of $a$ may be read upon a graduated drum 7 and upon a graduation of the hand wheel 6 recording the fractions of a revolution effected by the operating screw.

The utility of the constructions which permit the plane of the levels to be invariably fixed with reference to the axis of the column of the sighting apparatus, while permitting to the whole, inclinations measurable at will in the plane of each level, is evidenced by the description of an operation of sighting, of which the several phases are separately explained in order that the operation may be appreciated.

Figure 8:
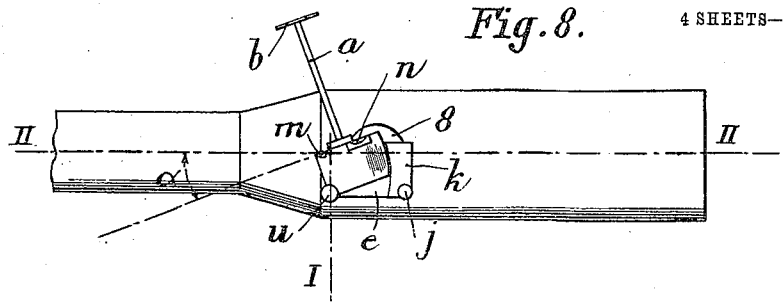
Figure 9:
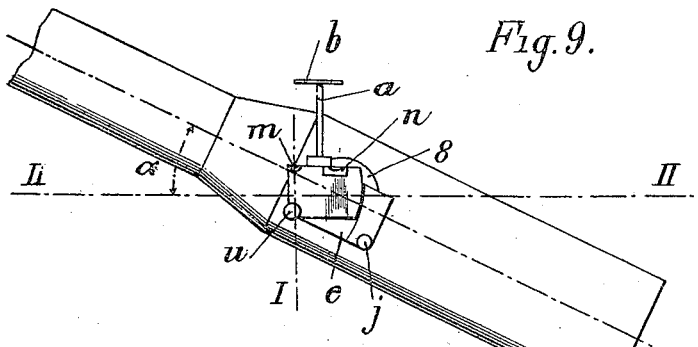
Figure 10:
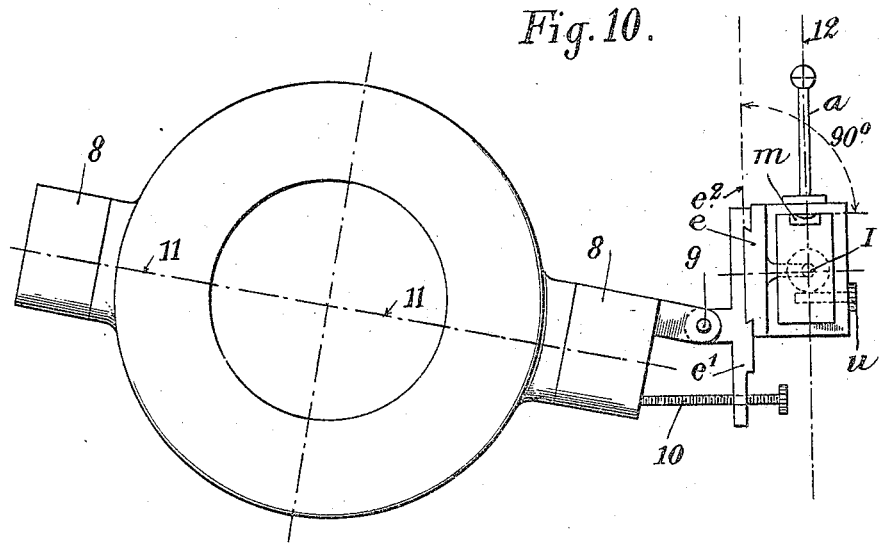

Suppose at first the arm $e$ of the apparatus be fixed to the trunnion 8, Fig. 8: The cannon being horizontal, if the block $c$ is inclined at an angle $-\alpha$, measured on the plate $k$, Fig. 3, the longitudinal level $n$ and the line of sight $b$ are inclined downwardly. This rotation, produced by the aid of a handle $j$, is effected around the horizontal axis I projected from axis II. If the mouth of the cannon is elevated the axis of the cannon will be inclined $+\alpha$ when the level $n$ is horizontal. (Fig 9.) Now, in reality, as is shown in Fig. 10, the arm $e$ of the apparatus is connected by an extension $e'$ to the trunnion 8, and this by pivoting around an axis 9 parallel to the axis of the cannon. This extension $e'$ may be turned around the axis 9 under the action of screw 10. If, by construction, the transverse level $m$ makes an angle of 90° with the face $e^2$ of the extension, there will result from this that, whatever the inclination of the axis 9, the plane of the face $e^2$ will always be parallel to that axis, and the level $m$ will always be perpendicular to the plane $e^2$.

Suppose the axis 11 of the trunnions is inclined toward the right (Figs. 10 and 11): To bring back the level $m$ to the horizontal, it will be necessary, by the aid of the screw 10, to move the arm of the extension $e'$ away from the face of the trunnion 8. In this movement the extension $e'$ will turn around the axis 9, and it will be seen that, if this axis 9 is inclined following the angle of fire, the plane of sight, thus rendered parallel to the plane of fire, will be turned around the axis 9; its horizontal track will be turned toward the right exactly to the extent which the horizontal track of the plane of fire has been turned to the right, when the cannon is passed from the horizontal to the angle of fire, in turning around the axis 11. The influence of the inclination of the trunnions has therefore been corrected, and, besides, after the described operations have been accomplished (Figs. 9 and 10), the column $a$ is rigorously vertical.

Figure 11:
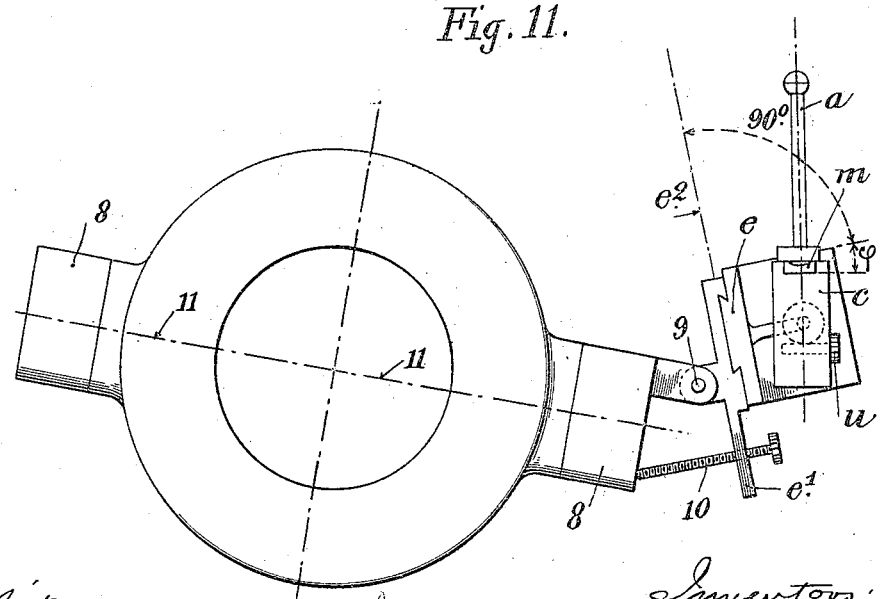

For the sake of clearness, it was supposed above that, by construction, the level $m$ was perpendicular to the face $e^2$ of the extension $e'$. Now the apparatus permits of varying in a measurable manner the angle of the level $m$ to the face $e^2$, as shown in Fig. 11 where this angle is 90° $+\phi$. The disposition of the instrument is in effect such that the block $c$ that we have seen turned in Figs. 8 and 9 around the axis I—I can equally be turned around the axis II—II (Fig. 9) which intersects axis I (Fig. 10). The object of this novel construction is as follows:—It is known that the influence of the grooves of the cannon (rifled toward the right, for example) causes the projectile to deviate toward the right; it is equally well known that the inclination of the trunnions (toward the left, for example) has for effect to deviate the plane of fire toward the left. Now it is demonstrable ballistically that " for each sort of projectile fired in a determined manner, the deviation toward the right (cannon rifled toward the right) is at each instant equal to the quantity which the projectile would be deviated toward the left by a fixed inclination φ of the axle toward the left."

Referring to Fig. 10 the influence of the inclination of the axis 11—11 of the trunnions is corrected by bringing the block c and its level m into horizontal position by manipulating screw 10. If now block c and its level m are inclined at an angle φ to the right, for example, for correcting deviation due to rifling by manipulating handle u and then restored to horizontal position by screw 10, as in Fig. 11, the correction for rifling has been added algebraically to that for the inclination of the axis 11—11 of the trunnions. Therefore, when the plane of sight is brought on the object, by displacing the cannon, the plane of fire will be directed to the left of the object; the deviation which causes the shots to fall to the right of the fire, brings them back in the direction of the object, and accordingly this cause of error is corrected.

None of the known apparatus present constructions permitting to leave the plane of the two levels invariably associated with the axis of the column of the sighting apparatus, while permitting to give to the whole inclinations measurable at will in the plane of each level, and do not solve the problem that we have put, and of which the practical solution is given by the series of operations following: 1st. Incline the block c in measuring with the level n the angle α to give to the cannon, and maneuver the cannon to restore the horizontal level. 2nd. Incline the block in measuring with the level m the angle φ to give to the apparatus for the projectile employed, and maneuver the screw 10 to restore the horizontal level m. 3d. Direct the plane of sight 12—12 on the object by displacing the cannon. This done, the cannon has received the desired angle, and its plane of fire is directed to the left of the object (cannons rifled toward the right) to a degree exactly desirable in order that the influence of the inclination of the trunnions and that of the deviation may be corrected. Besides, the column being, by construction, always perpendicular to the plane of the levels, has become again rigorously vertical; all the auxiliary planes of sight that one will take about the cannon will be planes turning around this vertical, which presents evident advantages; there is not, therefore, any apparatus of which the level inclines with relation to the column, as shown in Figs. 12 and 13, which represent diagrammatically, in elevation, such an apparatus adapted to a cannon. In effect, after parting from the horizontal, Fig. 12, there has been given to the cannon the angle α (Fig. 13), in bringing back the bubble between its marks, the column a in inclined from a and the auxiliary planes of sight that would be chosen from this moment would not all pass by the same vertical.

What we claim is:—

1. In a sighting apparatus for guns, the combination of a member adapted to be supported on a gun and provided with a spindle, a bearing member revoluble on said spindle, a telescope and a level-supporting block provided at one end with a recess for receiving said bearing, and provided at the opposite end with a pivot support located in the axis of said bearing, means on said supporting member engaging said pivot for turning the block on said spindle, and means on said block engaging said bearing for turning the block on an axis at right-angles to said spindle.

2. In a sighting apparatus for guns, the combination of a member adapted to be supported on a gun and provided with a spindle, a bearing member revoluble on said spindle, a telescope and level-supporting block provided at one end with a recess for receiving said bearing, and at the opposite end with a pivot support in line with the axis of said bearing, a socket in said block for receiving a telescope column and means on said block for rotating the column, means on said supporting member engaging said pivot for turning said block about said spindle, and means on said block for turning the block on an axis at right-angles to said spindle.

3. In a sighting apparatus for guns, the combination of a member adapted to be supported on a gun and provided with a spindle, a screw-threaded bearing member revoluble on said spindle, a telescope and level-supporting block provided at one end with a recess for receiving said bearing member and at the opposite end with a pivot support, a globe screw on said supporting member engaging said pivot and means for rotating said screw, and means on said block engaging said bearing to turn said block on an axis at right angles to said spindle.

In testimony whereof we have signed this specification in the presence of two subscribing witnesses.

CHARLES PROSPER EUGÈNE SCHNEIDER.
EMILE RIMAILHO.

Witnesses:
 EUGÈNE CHANCE,
 PIERRE GALAN.